Figure 1:
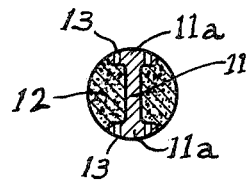

Aug. 9, 1949.  E. J. HOUDRY  2,478,194
CATALYST PELLET
Filed Nov. 2, 1944

INVENTOR
EUGENE J. HOUDRY
BY
Ira L. Nickerson
ATTORNEY

Patented Aug. 9, 1949

2,478,194

UNITED STATES PATENT OFFICE 2,478,194

CATALYST PELLET

Eugene J. Houdry, Ardmore, Pa., assignor to Houdry Process Corporation, Wilmington, Del., a corporation of Delaware Application November 2, 1944, Serial No. 561,552

5 Claims. (Cl. 252—477)

This invention relates to catalysis and to contact masses for promoting, controlling or in any manner assisting in the direction and extent of organic reactions. The present application is a continuation-in-part of my copending application Serial No. 439,338, filed April 17, 1942, now Patent No. 2,423,835, dated July 15, 1947.

One object is to simplify and to improve catalytic operations and apparatus. Another object is to provide novel forms of contact masses. Other objects will be apparent from the detailed description which follows.

The invention involves simplification and cheapening of apparatus for conducting catalytic operations on a commercial scale. It further provides for operating the same on an adiabatic basis by utilizing the apparatus for successive reactions which complement one another so that the contact mass is continuously maintained within a temperature range suitable for the reactions without requiring an extraneous heating or cooling fluid to be circulated through or around the reaction chamber. The contact mass is made up of active and inactive parts in uniform distribution within the contact or reaction chamber. An important characteristic of the mass is its high specific heat per volume of mass which enables the mass to absorb or to store up heat which can be subsequently released as desired or required.

In the selection of a contact mass due consideration is given to the heat of reaction and to the quantity of coke deposit per volume of contact mass needed to produce the proper quantity of heat during regeneration. In general the volumetric ratio of active catalyst to inactive heat absorbing material will be in the range of 1:3 (25% catalyst) to 3:2 (60% catalyst), depending upon the specific heat and the weight of the inactive material as compared with the same characteristics of the active catalytic material. Any known or suitable catalysts may be utilized. For cracking operations silicious catalysts are suitable, such as blends or compounds of silica and alumina, of natural or artificial origin, with or without the inclusion of other active components such as metals or metallic compounds, etc. For dehydrogenation operations the usual dehydrogenating catalysts such as chromium, molybdenum, vanadium, iron, nickel, etc., may be utilized.

Among the commercial materials which are suitable for heat absorption are the following:

|  | Density | Specific Heat | Heat capacity expressed as gram-calories per liter (solid) per deg. C. |
|---|---|---|---|
| Iron (Metal) | 7.7 | 0.17 | 1,310 |
| Fused alumina (Trade names —Aloxite, Alundum) | 3.95 | 0.31 | 1,250 |
| Magnesite Brick | 3.5 | 0.31 | 1,070 |
| Dead Burned Magnesite Ore | 3.1 | 0.31 | 950 |
| Chrome Brick | 3.95 | 0.29 | 1,140 |
| Silica Brick | 2.35 | 0.32 | 760 |
| Fireclay Brick | 2.6 | 0.26 | 680 |
| Ganister (Quartz) | 2.6 | 0.31 | 800 |

Additional materials of differing heat capacities are readily prepared, if needed, of which the following may serve as examples:

|  | Heat Treatment | Density | Specific Heat | Heat capacity expressed as gram-calories per liter (solid) per deg. C. |
|---|---|---|---|---|
| (1) 40% Bentonite, 60% Kaolin | 1,400° F. for 2 hrs | 1.7 | 0.26 | 440 |
| (2) 20% Bentonite, 80% Kaolin | do | 1.64 | 0.26 | 425 |
| (3) 10% Bentonite, 40% Kaolin, 50% Iron | do | 2.33 | 0.21 | 490 |
| (4) 10% Bentonite, 40% Kaolin, 50% $Fe_3O_4$ | do | 2.13 | 0.25 | 530 |

The heat capacities listed above are at 540° C. (1000° F.) and are the true measure of comparison between materials since they express the amount of heat stored in a unit volume of the material. In some instances the materials utilized for heat storage will not be entirely inert catalytically and will in some degree either improve or impair the reaction. It is also expedient at times to incorporate in the catalytic portion of the contact mass, or in the inert portion, or in both portions, a small quantity of metal or metallic compound, as of manganese, nickel, copper, cobalt, chromium, iron, etc., to serve as an oxidation promoter thereby to insure more rapid and complete burning of coky deposits during regenerating periods after the manner disclosed in my U. S. Patent No. 2,078,951, issued May 4, 1937.

By suitable control of operating conditions and of coke deposit I have found it to be entirely feasible to operate on a commercial scale and for extended periods in adiabatic cycle within a range of about 150° F. or less, at temperature above 700° F.; for example, refining and desulphurizing operations on petroleum distillates can be conducted in the range of 750° to 850° F., or with a mean temperature of about 800° F.; dehydrogenating and cracking operations to produce lighter hydrocarbons such as motor fuel, aviation fuel, etc. from heavier hydrocarbons can be effected in the range of 850° to 975° F. or with a mean temperature of about 925° F.; more drastic dehydrogenating or cracking operations, as to produce gases, especially of the unsaturated or olefinic type, can be conducted in the range of 975° to 1075° F. (mean temperature about 1025° F.) or even higher as in the range of 1075° to 1175° F. (mean temperature about 1125° F., etc.)

The accompanying drawings indicate typical forms of composite catalytic masses or units for conducting the above operations.

Figure 1A:
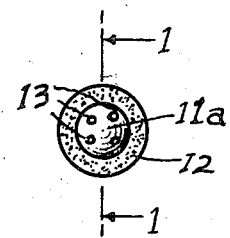
Figure 2:
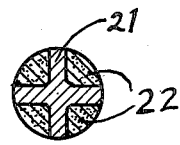
Figure 2A:
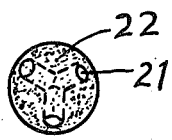
Figure 3:
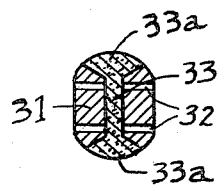
Figure 3A:
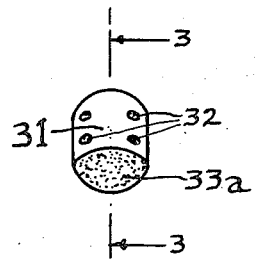

Figs. 1, 2 and 3 are vertical sectional views through individual pieces of contact masses in which the catalytic material is combined with an inert or heat absorbing material; and Figs. 1a, 2a and 3a are elevational views, respectively, of the contact masses shown in Figs. 1, 2 and 3.

The composite contact masses shown in Figs. 1 and 1a, Figs. 2 and 2a, Figs. 3 and 3a have the catalytic and inert materials combined in the individual units making up the mass, the inert portions being indicated by full section lines and the catalytic material in dotted sections in the sectional views. In Figs. 1 and 1a the inert or heat absorbing portion of the mass comprises a central portion 11 extending therethrough with flattened or rounded ends 11a upon which the catalytic material 12 has been mounted or molded in the general form of an annulus. The ends 11a may be extended as desired to enclose a greater or smaller extent of the catalytic material and may be notched or apertured (as indicated at 13 in Fig. 1a) to give access of reactants to enclosed portions of the catalyst. Figs. 3 and 3a show somewhat the reverse of the mass shown in Figs. 1 and 1a since the inert material now forms an annulus 31, which may be perforated at intervals as indicated at 32 in Fig. 3a, and the catalytic material 33 makes up the central core of the composite mass and has rounded end portions 33a. The composite mass shown in Figs. 2 and 2a has the inert material 21 in the general form of "jacks" used in a child's game over and around which the catalytic material 22 has been molded. When composite contact units in the forms shown in the drawings are used and when the contact material is metal, it will be apparent that parts of the metal or inert portion of each of the units will be in contact so that there will be heat conduction throughout the entire contact material with a tendency to distribute the heat uniformly throughout the reaction chamber and to approach a constant temperature throughout the chamber.

In making composite contact masses or units of the present invention the support, core or heat absorbing part of the mass is preformed of inert or substantially inert material, the shaping of the same being effected in any known or desired manner. Desirable shapes of cores are illustrated in the drawing but other shapes may be utilized, the purpose being to insure so far as possible good bonding or retention of the catalytic material by the inert heat absorbing material. Perforating or notching of the heat absorbing core is of value in this respect as well as in facilitating access of reactants to all portions of the catalytic portion of the composite mass. The catalytic material is applied to the preformed core in any desired manner but usually by molding it upon the core. The composite mass is then dried and is usually given a heat treatment to fix its form, with or without other treatment to adjust the activity of the catalytic portion prior to charging a reaction chamber with the composite masses for use. While it is preferable to have both the catalytic and the inert portions of the composite mass form parts of the exterior surface of the composite mass as indicated in each of Figs. 1a, 2a and 3a the extent of the exterior surface of each can be made to vary by selection of the form of heat exchange core; the ratio of catalytic material to heat exchange material may also be varied by selection of form of core and by the quantity of catalytic material applied thereto. In charging a reaction chamber with composite masses a variety of forms of the latter may be used.

It is obvious that the composite masses of the present invention may be utilized in conventional converters of either the fixed bed or moving bed type. In fact only a simple reaction chamber is required since the ratio as well as the exact distribution of catalytic and heat retaining material is established and maintained throughout the chamber by the herein disclosed composite contact masses or units. Hence illustration of any particular type of converter is deemed to be unnecessary. However, on account of high reaction temperatures the interior walls of the converter or reactor should be protected by fire brick or other heat insulating material. Typical operations such as cracking of hydrocarbons for the production of gasoline, including high grade aviation base stock and other special products such as toluene, also dehydrogenating operations as in conversion of butane to butenes and butadiene, for which the composite masses are adapted are set forth in detail in my aforesaid Patent No. 2,423,835.

For continuous operation of a fixed bed plant utilizing the herein disclosed type of composite contact mass two converters with reaction chambers filled with a multiplicity of such masses or units will be required when the on-stream and regenerating periods of the adiabatic cycle are of the same length and three converters will be needed when the regenerating period of the cycle is twice as long as the on-stream period. When the operating conditions have been established and the converters brought to temperature with adequate heat storage capacity in the inert portions of the composite masses or units the temperature swing in the cycles of on-stream and regenerating reactions becomes uniform and regular and the variations are slight, merely a degree or two per cycle, so that any necessary adjustment will be infrequent and easily made in any one of a number of directions, as on entering temperatures of the reactions, on feed rate or rates, composition of reactants, etc.

Metals, such as iron and steel, present a high degree of heat capacity per volume of space occupied. The use of such metals in the composite contact masses or units gives good temperature control for adiabatic operations. However, the presence of iron oxide is detrimental to many reactions. Hence it is desirable to use alloys resistant to oxidation or to protect surfaces of such metals from oxidation as by calorizing, chrome plating enameling, etc.

In adiabatic operations utilizing the composite masses of the present invention the on-stream periods are normally less than thirty minutes and the reactions are conducted so as to produce coke deposit not in excess of 15 grams per liter of active component of the composite mass or unit. Usually the coke deposit is considerably lower as between 4 and 10 grams per liter. In dehydrogenating operations it is important for best results to operate with clean catalyst so as to maintain a straight dehydrogenating reaction. Accordingly, the operating periods are short and the coke lay down low, as of the order of 1% by weight of the charge necessitating heat to be supplied during the regenerating period by high temperature air, flue gas, etc.

By use of composite masses or units of the present invention accurate ratio of heat absorbing material to catalytic material can be established without difficulty and what is more important from the standpoint of control of reactions in a adiabatic cycle is the maintenance of the distribution of catalyst and heat absorbing material throughout the entire reaction chamber. It will also be apparent that composite masses or units of the present invention establish an effective interlock between the heat absorbing and the catalytic portions of each unit so that separation and breakdown of the unit is kept to a minimum. When the heat absorbing and the catalytic materials are chosen so as to have little difference in their coefficients expansion and especially when the surfaces of the preformed support or core of the unit is irregular there is good adherence of the two materials making up the unit. However, in many instances it is desirable to use binders or cementitious materials to improve the adherence and still further to minimize or to avoid cleavage and separation of the components of the masses or units.

I claim as my invention:

1. A unitary pellet of substantially regular geometric shape for use in a mass of a number of said pellets to effect fluid contacting operations consisting essentially of two mutually interlocking solid bodies of complementary shape, each of said bodies co-acting with the other in the interior of said pellet to fix its position within said pellet and each body presenting separate and contiguous portions of the exterior surface of said pellet, one of said bodies being of adsorptive material occupying at least 40% of the total volume of said pellet, and the other of said bodies being of catalytically inert oxide of higher heat capacity than said adsorptive material and at least 425 gram-calories per degree centigrade and occupying at least 25% of the total volume of said pellet.

2. A unitary pellet of substantially regular geometric shape for use in a mass of a number of said pellets to promote chemical change within a fluid charge consisting essentially of two mutually interlocking solid bodies of complementary shape, each of said bodies co-acting with the other in the interior of said pellet to fix its position within said pellet and each body presenting separate and contiguous portions of the exterior surface of said pellet, one of said bodies being of material exhibiting catalytic activity with respect to said charge and occupying at least 40% of the total volume of said pellet, and the other of said bodies being of oxidic material substantially inert with respect to said charge, having heat capacity greater than that of said catalytic material and at least 800 gram-calories per degree centigrade and occupying at least 25% of the total volume of said pellet.

3. A unitary pellet of substantially regular geometric shape for use in a mass of a number of said pellets to effect fluid contacting operations consisting essentially of two solid bodies of complementary shape, one of said bodies extending from the center of said pellet to the exterior thereof at a plurality of points to provide separate portions of its peripheral surface of greater total area than twice the cross-sectional area of said body at the center of said pellet, the other of said bodies enclosing said first named body in interlocking relation therewith and presenting the balance of the peripheral area of said pellet, one of said bodies being of catalytically active material occupying at least 40% of the volume of said pellet, and the other of said bodies, occupying at least 25% of the volume of said pellet, being of catalytically inert oxidic material having heat capacity greater than that of said catalytically active body and at least 425 gram-calories per degree centigrade.

4. A unitary pellet of the type described in claim 3 wherein the catalytically active body is that extending from the center to the surface of said pellet.

5. A unitary pellet of the type described in claim 3 wherein the catalytically inert body is that extending from the center to the surface of said pellet.

EUGENE J. HOUDRY.

REFERENCES CITED

The following references are of record in the file of this patent:

UNITED STATES PATENTS

| Number | Name | Date |
|---|---|---|
| 912,950 | Gibert | Feb. 16, 1909 |
| 1,014,996 | Bennett | Jan. 16, 1912 |
| 1,697,266 | Ellis | Jan. 1, 1929 |
| 1,874,743 | Harnsberger | Aug. 30, 1932 |
| 1,966,553 | Kropp | July 17, 1934 |
| 2,161,676 | Houdry | June 9, 1939 |
| 2,185,930 | Simpson et al. | Jan. 2, 1940 |
| 2,212,932 | Fairlie | Aug. 27, 1940 |
| 2,255,041 | Anderegg | Sept. 9, 1941 |
| 2,267,767 | Thomas | Dec. 30, 1941 |
| 2,312,006 | Thiele | Feb. 23, 1943 |
| 2,315,329 | Hood et al. | Mar. 30, 1943 |
| 2,323,728 | Ruthruff | July 6, 1943 |
| 2,331,521 | Utterback | Oct. 12, 1943 |
| 2,356,954 | Teter | Aug. 29, 1944 |
| 2,382,371 | Utterback II | Aug. 14, 1945 |

FOREIGN PATENTS

| Number | Country | Date |
|---|---|---|
| 567,480 | France | Dec. 7, 1923 |